US005603435A

United States Patent [19]

Fenwick

[11] Patent Number: 5,603,435

[45] Date of Patent: Feb. 18, 1997

[54] REPAINTING GUN

[76] Inventor: Crispian A. Fenwick, 530 Falmer Road, Woodingdean Brighton, East Sussex, BN2 6ND, England

[21] Appl. No.: 381,850

[22] PCT Filed: Aug. 6, 1993

[86] PCT No.: PCT/GB93/01668

§ 371 Date: Apr. 10, 1995

§ 102(e) Date: Apr. 10, 1995

[87] PCT Pub. No.: WO94/03279

PCT Pub. Date: Feb. 17, 1994

[30] Foreign Application Priority Data

Aug. 7, 1992 [GB] United Kingdom .................... 9216763
Mar. 26, 1993 [GB] United Kingdom .................... 9306300

[51] Int. Cl.$^6$ ...................................................... G01F 11/20

[52] U.S. Cl. .......................... 222/240; 222/241; 222/242; 222/413; 222/527; 198/662

[58] Field of Search .................................... 222/240, 241, 222/242, 527, 413; 198/498, 662, 671, 676

[56] References Cited

U.S. PATENT DOCUMENTS

| | | | |
|---|---|---|---|
| 3,768,939 | 10/1973 | Gramling | 425/87 |
| 5,054,658 | 10/1991 | Aronie | 222/240 X |
| 5,244,123 | 9/1993 | Benedict | 222/231 X |

*Primary Examiner*—Gregory L. Huson
*Attorney, Agent, or Firm*—Chilton, Alix & Van Kirk

[57] ABSTRACT

A hand-held repointing gun has an inclined feed chamber, which receives the material to be applied, and a driven feed screw which conveys the material from the chamber to an applicator nozzle. The discharge end of the nozzle defines an axis which is oriented at an angle with respect to the chamber whereby gravity feed of the material to the nozzle supplements the delivery action of the feed screw to minimize power consumption of the feed screw drive mechanism.

24 Claims, 4 Drawing Sheets

REPAINTING GUN

The present invention relates to apparatus for applying a fluent material to a surface, and especially, but not exclusively, to a device for applying mortar or grout to brickwork during repointing and for grouting applications in general.

The usual method of repointing brickwork of, for example, a wall or chimney, is to mix grout on a board and then apply it with a trowel. This is time-consuming and tiring. Moreover, much of the grout is lost through being dropped or being inaccurately applied to too great an area and needing to be washed off. This is both messy and wasteful.

Powered grouting apparatus has been suggested in which grout is pumped from a pumping unit to a hand-actuated applicator through connecting tubes. This apparatus speeds up repointing and makes it less of an effort, but is expensive and unsuitable for use on high walls or chimneys, as the grout supply tubes are of restricted length and it is impractical to move the, rather bulky, pumping unit from ground level.

The present invention aims to overcome these problems, and provides a fluent material applicator in the form of a hand-held unit having a chamber therein communicating with an applicator nozzle, and a feed screw disposed within the chamber, the feed screw being arranged, in use, to feed fluent material from the chamber out through the applicator nozzle.

The present invention allows repointing, for example, to be carried out almost anywhere in an efficient and clean manner. The chamber may be filled with grout, and the applicator nozzle aimed to guide the grout to the desired application point. The feed screw may then be actuated, and the grout urged out of the nozzle, and into, for example, a joint between two bricks. The nozzle defines the area of application, so that the grout is applied precisely where it is needed without waste or mess, whilst the feed screw allows for quick and easy application, and may be provided with a drive of variable speed to provide accurate control of the amount of grout deposited.

Furthermore, as the applicator is hand-held, and itself contains the grout, it is highly portable and may be used in many situations which are inaccessible to bulky equipment, such as upon a roof when repointing a chimney.

Although not necessary, it is preferred that the feed screw extends into at least a portion of the nozzle, as this allows for better feed characteristics, and helps to ensure that all the material in the chamber is used up.

It is preferred for the feed screw to be driven by a reversible drive. This allows the screw to be driven in reverse in order to agitate the material and ensure that it is properly mixed, before the screw is driven to feed the material through the nozzle. Indeed, rather than just give the material a final mix, the components of the fluent material may be separately added to the chamber, and the material actually mixed in the applicator by driving the screw in reverse.

Preferably, mixing means comprising, for example, mixing blades or fins, shaped to effectively mix the fluent material when the screw is reversely rotated, may be provided on the same axis, and preferably same shaft, as the feed screw. This helps to ensure that the material is mixed properly prior to being fed out through the nozzle.

The mixing means may be provided in a separate portion of the chamber, behind the feed screw, and may provide a feed action during the forward rotation as, otherwise, some material may remain in the chamber, unless it is made to flow by other means, such as by having the chamber inclined to the horizontal to provide a gravity feed.

The chamber may be configured to form a feed chamber proximal to the nozzle, and a wider mixing chamber distal from the nozzle, as this has been found to be advantageous to mixing.

The chamber may taper towards the nozzle, and means for compressing the fluent material, again, for example, in the form of blades or fins, may be provided on the same axis, and preferably same shaft, as the feed screw (preferably between the feed screw and mixing means, where the latter is provided). Both these features aid in the feeding and compression of the material, and it has been found that a feed screw, especially with the compression means, is able to pressurise grout sufficiently so that further compression by a trowel, even into a deep joint, is unnecessary, which is advantageous considering the amount of grout normally wasted in such an operation.

Instead of, or in addition to, configuring the chamber into feed and mixing chambers, the applicator may be provided with a hopper for holding the fluent material. As a substantial amount of the material would then be somewhat off-axis from the feed screw and/or mixing means, and so subject to little mixing, the hopper may be provided with hopper mixing means, such as a paddle wheel. This means could be driven separately from the feed screw, from the same source, or from the feed screw/mixing means by direct engagement therewith. The hopper is preferably to the rear of the chamber, so that the rear of the hopper and the chamber coincide. This is to prevent material from becoming stuck in a pocket at the rear of the chamber and remaining unmixed, which could occur if the chamber extended further back than the hopper. To further aid in the circulation of the material between the hopper and chamber, the end of the chamber distal from the nozzle may be curved to guide the material into the hopper.

In some circumstances, the applicator may not hold enough material in one charge to complete a task, for example where a large wall needs to be completely repointed. Indeed, it is undesirable for the applicator to carry too much charge, as it would become too heavy and cumbersome to use properly. Therefore, the applicator may need to be replenished, and this may be accomplished quite simply by, for example, having a container of grout at hand. Further, as the material may be mixed within the applicator itself, the material components may be kept separate until further material is required, so that there are no problems with, for example, material drying out before use. As an alternative to this, however, a sack or bag means may be provided which holds the fluent material, or components thereof, and which may be connected to the chamber (via a hopper if one exists). The bag/sack means may be carried on a user's back and allows for easy refilling of the applicator without having to carry around containers of grout etc. The material could even be supplied in, for example, vacuum-packed sacks, to keep the contents workable, and/or have separate compartments for carrying the individual components of a material.

The drive and power supply for the feed screw may take many forms. The screw could be powered by an electric, hydraulic or pneumatic motor, with an electric, hydraulic or pneumatic supply being provided by leads from a source separate from the applicator. These leads would not need to be so restricted in length as the prior art fluent material tubes, and need not be as heavy, so that an applicator according to the present invention with such a source would still offer considerable benefits over the prior art. Preferably, however, the applicator has a self-contained power source such as normal or rechargeable, for example nickel-cadmium, batteries, as there is then no danger of power supply leads becoming entangled or causing hazards, etc.

Alternatively, the applicator may be provided with a remote power supply and one particularly convenient form comprises a flexible mechanical drive (e.g. of the kind comprising a flexible core rotatably mounted within a flexible tube) driven by a power source which is separate from the applicator. A particularly convenient power source would be an electric motor driven by batteries. The motor and batteries may be small enough to be carried on the body of the operator, such as by means of a shoulder strap or belt. The motor unit may be provided with an on-off switch and optionally a speed control, but preferably conductors are led along the route of the flexible mechanical drive to suitable control switches mounted on the body of the applicator.

Especially where self-contained power supplies are used, the power needed to drive the feed screw, and mixing/compression means, is preferably kept low, as the applicator needs to last for an acceptable period of time before requiring a recharge or new batteries. It is preferable then for the feed screw, and mixing/compression means, to be driven as easily as possible without needing to be supplied with too much torque. This increases battery life, and may allow lighter motors to be used and so lighter applicators to be produced. It is preferred therefore, for the chamber to be inclined at an angle to the horizontal, with an angle of substantially 45° being particularly advantageous. This allows gravity to aid in the fluid flow.

It is also preferred for the mixing and compression means, and possibly the feed screw, to be sized and arranged to provide a sufficient gap between themselves and the chamber walls to keep the friction low. This may advantageously be done when the screw chamber is inclined, as the material adjacent the walls will then still flow towards the nozzle due to gravity, rather than stick against the walls. It may, however, be desirable, where the feed screw extends into the nozzle to have the feed screw fit closely into the nozzle in a watertight manner so as to prevent the material from drying out.

By inclining the chamber, a further advantage may result, in that bearings mounting the feed screw in the top end of the chamber may be kept clear of the fluent material, and so be less prone to seizure. For a similar reason, the bearings may be provided with a cover to prevent contamination during loading of the fluent material into the chamber.

The bearings at the top of the chamber may take any suitable form, and, whilst it is possible to also mount the nozzle end of the screw on bearings, this may hinder the flow of the fluent material, especially in cases where the feed screw extends into the nozzle. In this case, then, it is preferred for the feed screw to be left unsupported at the nozzle end, except possibly by the side walls of the nozzle. This then allows for a free flow of material through the nozzle. The nozzle may then be subjected to substantial wear, especially if the fluent material is of an abrasive nature, and the nozzle may be made to be replaceable, in which case it is possible to provide the applicator with nozzles of many different shapes, sizes and angles to take account of different use situations.

An advantageous form of nozzle comprises a tube which is flexible, but sufficiently stiff to be settable into a desired position. For example the kinds of tube consisting of a metal coil or bellows which are used for coupling water taps to misaligned supply pipes, or for microphone and desk lamp stands, may be used, preferably with a plain plastic liner to avoid the fluent material settling in the corrugations. The operator may set the end of the nozzle into any convenient orientation to suit the job in hand.

Besides the nozzles being replaceable, the feed screw/mixing/compression means and chamber may also be removable for replacement and/or cleaning. The chamber could, for example, be slidingly mounted on a hand-grip portion of the apparatus along a guide groove and held in position by a latch. The feed screw shaft may extend through the distal end of the chamber, and engage with a quick release bearing on the applicator. The shaft may be removable from the chamber by dimensioning the feed screw, and if appropriate the mixing and/or compression means, to fit through a supply aperture in the chamber or through an aperture left when the nozzle or feed chamber is removed. In a further embodiment, the chamber may be provided with a lid at the end distal from the nozzle by which the shaft may be removed.

The applicator may be made of any suitable materials. The chamber and hand-grip may be of a lightweight moulded plastics construction, and the feed screw and mixing/compression means may be of metal. A strap may be provided to carry the applicator and to provide a good support and grip when the applicator is in use.

Although the use of the applicator in repointing has been emphasised, it may also be used in many other applications, especially grouting work in general, and with many kinds of fluent material, such as plasticised materials. For example, the material could be plaster for filling cracks in plastering, or could be cement, mortar, or even icing sugar for icing a cake. Of course, the exact specifications of the applicator may be changed to suit the application, and an icing gun need not to be so robust or powerful as a repointing tool or have as much capacity, but would probably need to be lighter.

Embodiments of the present invention will now be described, by way of example only, with reference to the accompanying drawings, in which.

Figure 1:
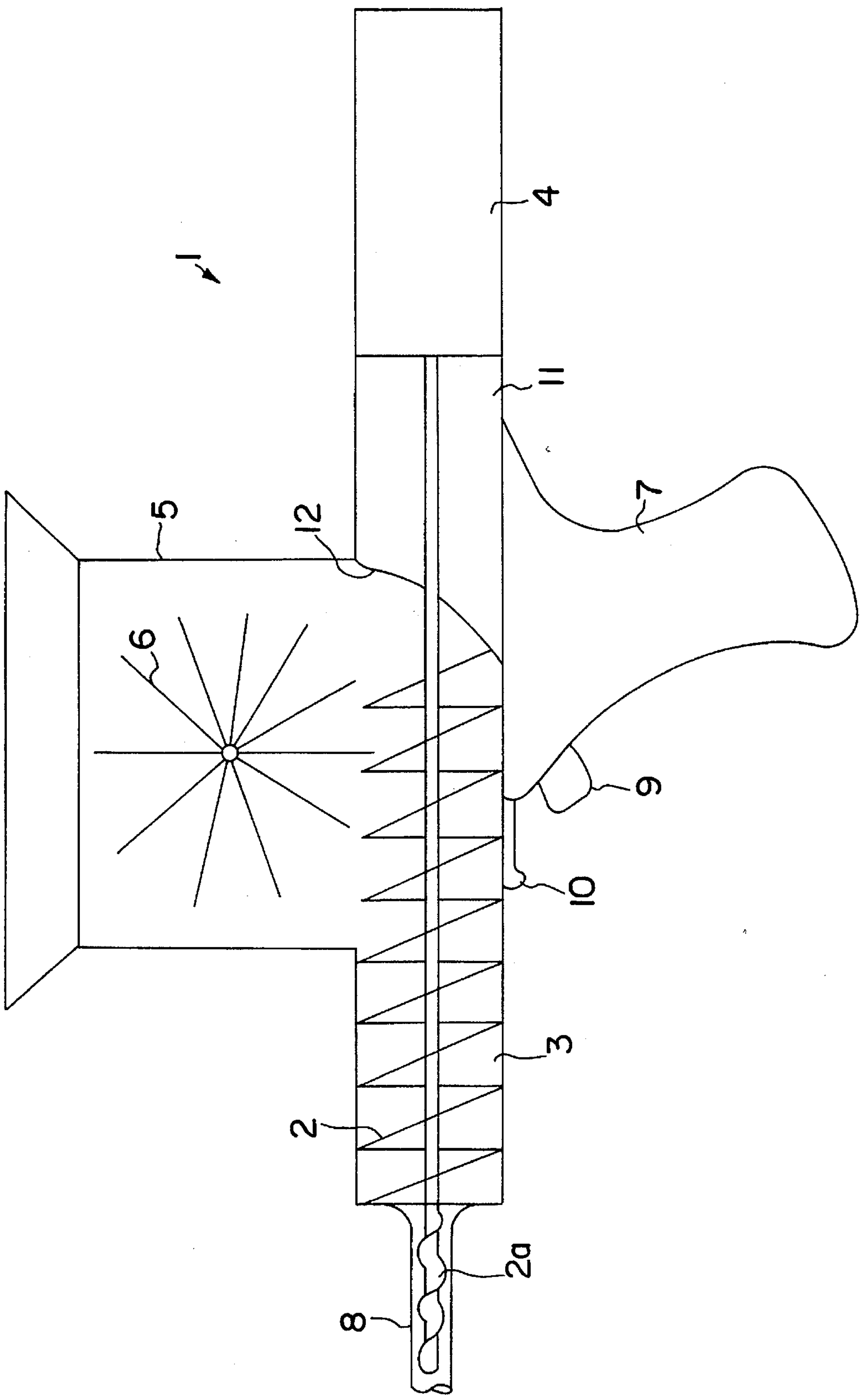
FIG. 1 is a schematic side view of a repointing gun according to a first embodiment, partly broken away.

Referring to FIG. 1, a repointing gun 1 mainly comprises a screw feed 2, chamber 3, motor 4, hopper 5, mixing paddle 6, pistol-grip 7, and nozzle 8.

The motor 4 is powered by rechargeable batteries (not shown) housed in the pistol-grip 7, and is actuated to drive screw feed 2 in a forward or reverse direction, dependent on a trigger switch 9 and forward/reverse switch 10 on the pistol-grip 7.

The feed screw 2 is mounted on bearings 11 housed between the screw 2 and motor 4 and includes a portion 2*a* extending into the nozzle 8.

When the feed screw 2 rotates, it urges fluent material in the chamber 3 either towards or away from the nozzle 8, and also turns the mixing paddle 6 with which it engages. The hopper 5 is connected to the screw chamber 3 at the chamber's rear, and the rear end wall 12 of the chamber 3 is formed in a curve. This aids in the circulation of the material and prevents a build-up of unmixed material at the rear end wall 12; such a build-up would be even more likely to occur if the screw chamber 3 extended back beyond the rear of the hopper 5 to define a pocket within which the material would become trapped and would not circulate.

When in use, fluent material or the components thereof are fed into the hopper 5. The feed screw 2 is then driven in reverse, and the material circulated within the rear portion of the chamber 3 and the hopper 5 until adequately mixed. The gun 1 is then pointed at the application area, and the feed screw 2 actuated to urge the fluent material out through the nozzle 8. The nozzle 8 may be guided over grout between bricks to repoint a wall.

Figure 2:
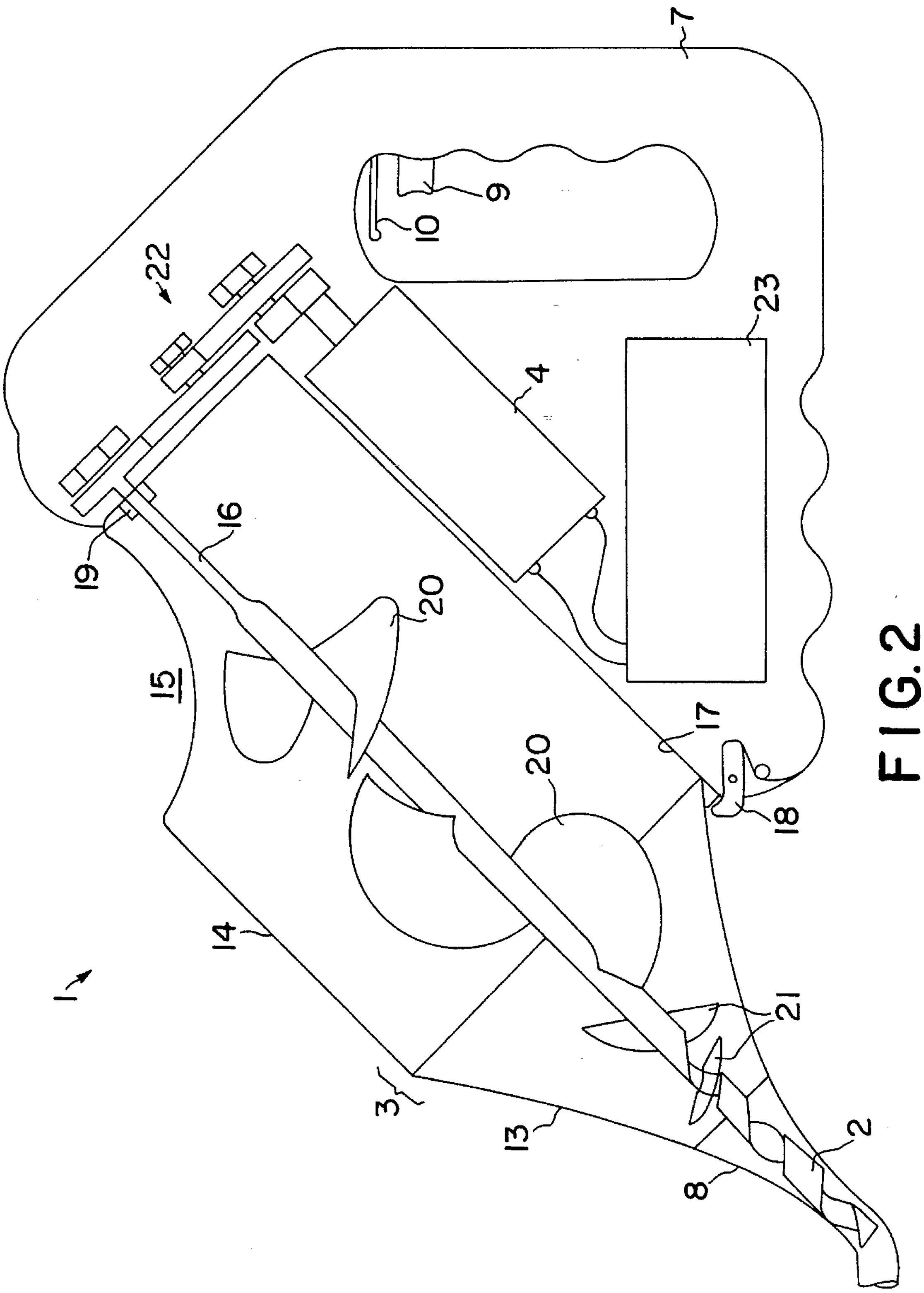
FIG. 2 is a side view of a repointing gun according to a second embodiment of the present invention partly broken away.
Figure 3:
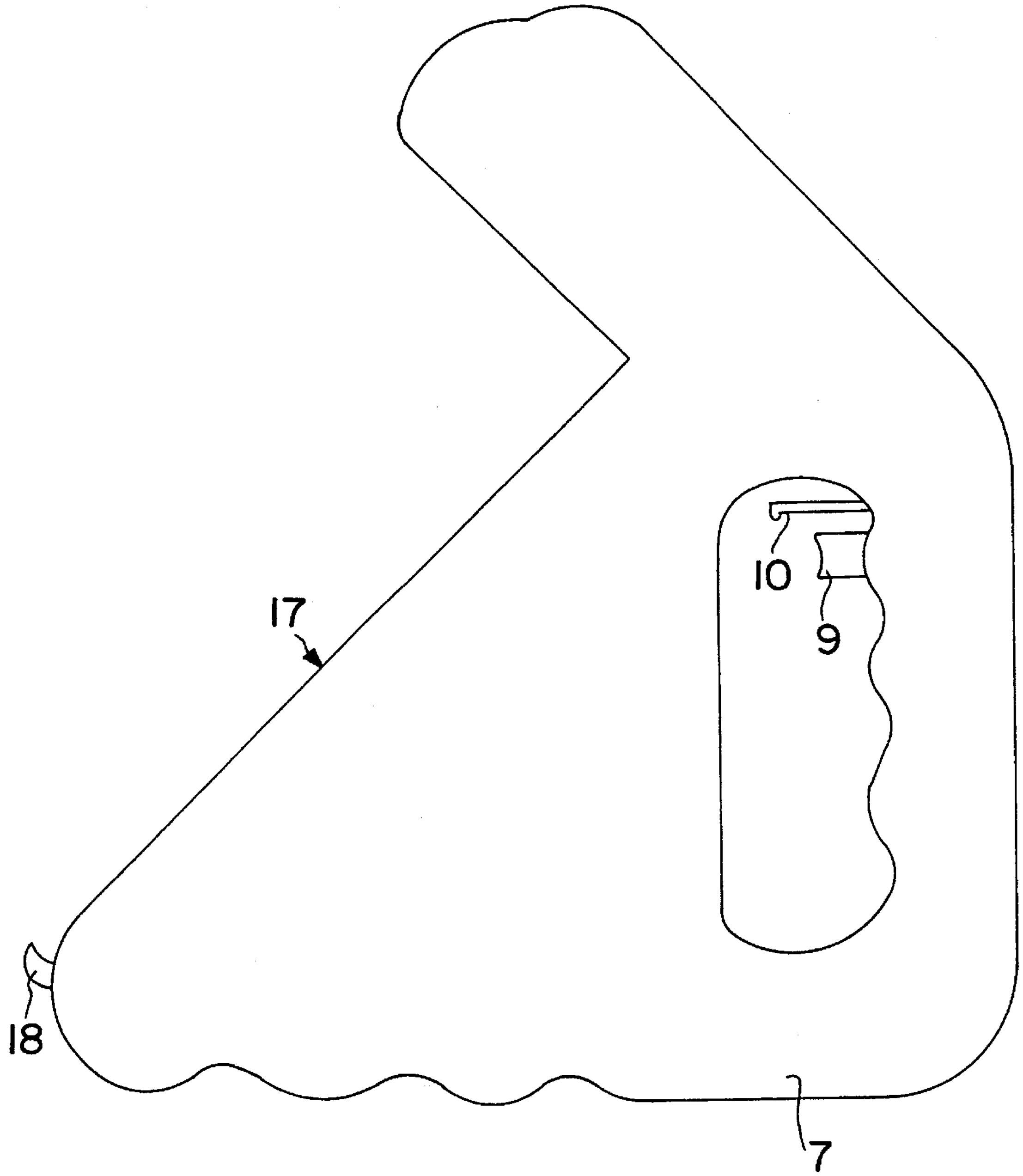
FIG. 3 is a side view of the hand-grip shown in FIG. 2.

Turning to FIGS. 2 and 3, these show a second embodiment of a repointing gun 1, which incorporates most of the main features of FIG. 1 (these being referenced as before).

In this embodiment, there is no hopper 5, and instead the chamber 3 is configured as a tapering feed chamber 13 and a mixing chamber 14, this latter chamber having an aperture 15 for the supply of fluent material.

The chamber 3 and feed screw shaft 16 are detachable from the hand-grip 7 (which, in this embodiment, is not of pistol-grip configuration), the chamber 3 being slidingly engageable with a grooved slide 17 and held in place, in use, by locking a latch device 18, and the shaft 16 being mounted on a quick release bearing 19.

To aid in mixing of the fluent material, mixing blades 20 are mounted on the feed screw shaft 16 in the mixing chamber 14, and to aid in the supply of the material through the nozzle 8, compression blades 21 are provided in the feed chamber 13. The fluent material is fed through the nozzle 8 by the feed screw 2, which again extends into the nozzle 8.

A gap is provided between both the mixing blades 20 and compression blades 21, and the sides of the feed chamber 13 and mixing chamber 14, to keep the friction sufficiently low. Also, the chamber 3 and shaft 16 are inclined at substantially 45° to the horizontal to allow gravity to aid in the material flow. The feed screw 2 may be a watertight fit to the nozzle 8 to prevent water from escaping and the material from drying up.

The motor 4 is mounted parallel to the chamber 3 to save space, and gearing 22 is provided to transmit torque to the screw feed shaft 16.

The motor 4 is powered by nickel-cadmium batteries 23 mounted in the hand-grip 7, and may be of variable speed to allow for accurate control of the amount of material fed out through the nozzle 8.

The applicator guns 1 in both embodiments may be made from any suitable material. For example, the chamber 3 and hand-grips 7 may be moulded from plastics material, and the feed screw 2 and mixing/compression blades 20, 21 may be made of metal.

Figure 4:
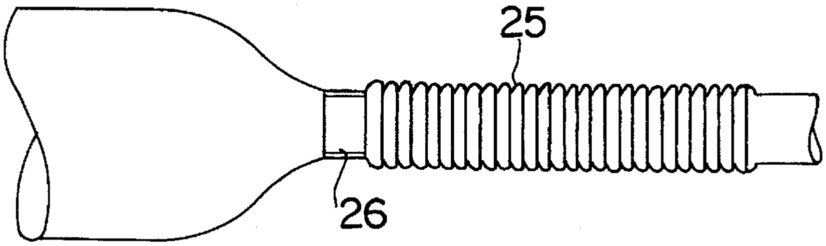
FIG. 4 shows a flexible nozzle.

The applicator may be provided with a number of replaceable nozzles. For example, FIG. 1 shows a straight nozzle and FIG. 2 an angled nozzle. One or other of these may be more convenient for a particular job. Alternatively, a flexible nozzle as shown in FIG. 4 may be provided. This may still be removable for cleaning purposes. It comprises a flexible tube 25 and preferably a plastic liner 26. The tube 25 will be sufficiently flexible to be bendable by hand, but once bent remains in position during use until it is bent by hand into a new position. Various forms of metal tube are known, consisting of metal coils connected to each other at their edges, or corrugated tubes. A well known form of flexible tube is used for connecting water taps to supply pipes which may not be accurately aligned with the taps.

Figure 5:
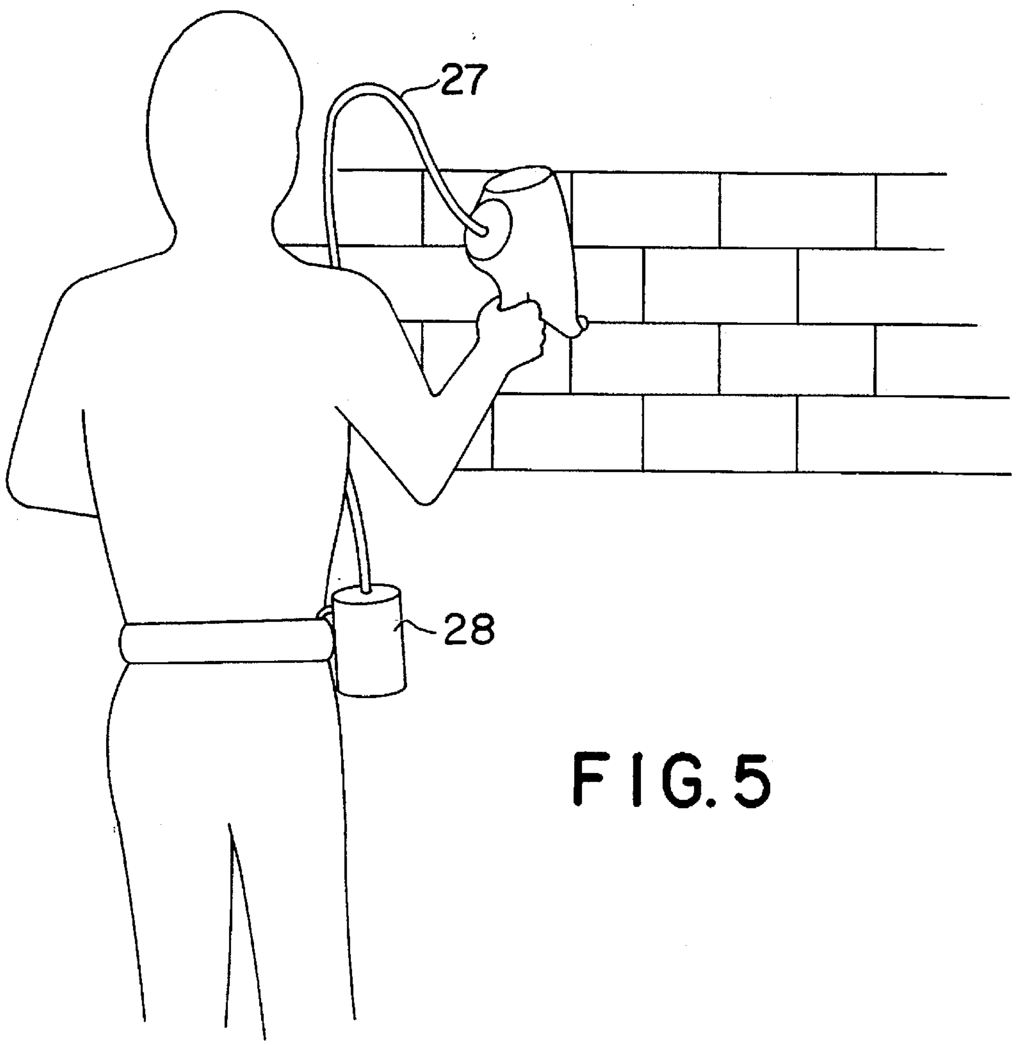
FIG. 5 shows a third embodiment of the invention.

FIG. 5 shows a third embodiment of the invention in which the feed screw is driven from a remote power source 28 via a flexible mechanical drive 27. The power source may comprise an electric motor (and if necessary a gearbox) and suitable batteries, e.g. rechargeable batteries. The power source may be carried on the person of the operator, such as on a shoulder strap or belt. The controls for the motor may be mounted on the power source 28 but preferably they are mounted on the applicator in a convenient position and connected to the power source 28 via a suitable conductors. Again, the controls preferably allow forward or reverse drive and variable speed.

Many variations on the above embodiments may also be envisaged. For example, the chamber 3 of each embodiment could be provided with a bag or sack containing the fluent material or components thereof, so that refilling of the chamber 3 may be quickly and easily achieved. Also, although, in the second embodiment, the bearings 19 are held out of contact with the material due to the incline of the chamber 3, they may still become clogged when filling the chamber or mixing the fluid, and so may be provided with suitable cover means to prevent this. Instead of the aperture 15, the chamber 3 could be closed and have a lid at the top end. The pistol grip arrangement of the first embodiment, with the feed screw shaft and motor in line, could be used with the chamber arrangement of the second embodiment.

I claim:

1. In an apparatus for applying plaster, cement, mortar or grouting material to a surface, the apparatus having a hand-grip portion which defines a first axis, a feed chamber for receiving said material, an applicator nozzle in fluid communication with said feed chamber, and a feed screw having a shaft disposed within said chamber and defining a second axis, said feed screw being arranged to convey said material from said feed chamber through said applicator nozzle, said apparatus further having motor means for driving said feed screw, said motor means including a source of direct current, the improvement comprising said hand-grip portion, feed, chamber, feed screw and applicator nozzle being oriented with respect to one another such that, when said apparatus is held in the hand by said hand-grip with said first axis oriented substantially vertical during application of said material, said feed chamber and said feed screw shaft axis are inclined with respect to the horizontal to provide a gravity feed of said material to said applicator nozzle, said nozzle defining a third axis which is oriented substantially transverse to said first axis such that, in use, material conveyed from said feed chamber to said nozzle by said feed screw is ejected from said nozzle horizontally onto the surface which is to receive said material.

2. Apparatus according to claim 1, wherein said feed screw extends into a portion of said applicator nozzle.

3. Apparatus according to claim 1, wherein said drive motor means comprises a reversible drive.

4. Apparatus according to claim 3 further comprising mixing means connected to said reversible drive for mixing material in said feed chamber when said reversible drive is operated in reverse.

5. Apparatus according to claim 4, wherein said mixing means comprise blades provided on said feed screw shaft.

6. Apparatus according to claim 1, further comprising means on said feed screw shaft for compressing said material in said feed chamber.

7. Apparatus according to claim 1, further comprising mixing blades and compression blades affixed to said shaft of said feed screw.

8. Apparatus according to claim 1, wherein the chamber comprises a feed chamber portion proximal to the nozzle, and a wider mixing chamber distal from the nozzle.

9. Apparatus according to claim 8, wherein the feed chamber tapers towards the nozzle.

10. Apparatus according to claim 1, wherein the nozzle comprises a flexible tube settable at a desired orientation.

11. Apparatus according to claim 1, wherein a power supply and drive means are provided for the feed screw and said power supply and drive means are provided in the hand-held unit.

12. Apparatus according to claim 1, wherein the applicator further comprises a flexible mechanical drive from a motor separate from the hand-held unit.

13. Apparatus according to claim 1, wherein the hand-held unit comprises a hand-grip element having drive means for the feed screw, to which the chamber and feed screw are removably attached.

14. Apparatus according to claim 1, wherein the feed screw shaft extends through the end of the chamber distal from the nozzle, and engages with a quick release bearing for connecting the feed screw to a drive.

15. Apparatus according to claim 5, wherein means are provided on the feed screw shaft for compressing the fluent material.

16. Apparatus according to claim 15, wherein said compression means comprises compression blades and wherein said mixing blades and compression blades are provided on said shaft of said feed screw.

17. Apparatus according to claim 16, wherein the chamber comprises a feed chamber portion proximal to the nozzle, and a wider mixing chamber distal from the nozzle.

18. Apparatus according to claim 17, wherein the feed chamber tapers towards the nozzle.

19. Apparatus according to claim 18, wherein the nozzle comprises a flexible tube settable at a desired orientation.

20. Apparatus according to claim 19, wherein the feed screw shaft extends through the end of the chamber distal from the nozzle, and engages with a quick release bearing for connecting the feed screw to a drive.

21. Apparatus for the application of plaster, cement, mortar or grouting material to a surface, comprising;

a hand grip portion;

a chamber for receiving and holding the material to be applied;

a nozzle in fluid communication with said chamber, said nozzle having an outlet aperture at an end of the nozzle disposed distal from said chamber, said outlet aperture defining an axis; and a feed screw having a shaft with a longitudinal axis, said feed screw being at least in part disposed within said chamber to force material from said chamber out through said nozzle outlet aperture;

wherein said nozzle aperture axis is oriented at substantially 45° to the longitudinal axis of the feed screw shaft; and wherein said hand-grip portion, chamber and nozzle axis are oriented with respect to one another such that when the device is held in the hand with the nozzle aperture axis generally pointed towards a surface which is to receive said material, said chamber and feed screw shaft are inclined at substantially 45° to the horizontal to allow said material to be fed to the nozzle by gravity.

22. A hand-held device for the application of plaster, cement, mortar or grouting material onto a surface, said device comprising:

a hand grip portion;

a chamber for holding said material therein, said chamber having a discharge end and defining an axis, said chamber axis being oriented generally transversely with respect to said discharge end;

a nozzle in fluid communication with said chamber discharge end, said nozzle defining an outlet aperture at an end thereof which is distal from the chamber; and a feed screw disposed within said chamber to force said material from said chamber into said nozzle whereby said material will be discharged through said nozzle aperture, said feed screw being having a shaft which defines a longitudinal axis, an end of said shaft distal from said nozzle being mounted in bearing means provided at an end of said chamber distal from said nozzle;

wherein said hand-grip portion, chamber and nozzle are oriented with respect to one another such that when the device is held in the hand with the nozzle aperture pointed towards a surface which is to receive said material, said chamber axis and said feed screw shaft longitudinal axis are inclined at an angle to the horizontal to allow said material to be fed to said nozzle by gravity and to maintain said bearing means above the level of said material in said chamber.

23. The device of claim 22, wherein said nozzle discharge end is settable at a plurality of desired angles with respect to said axes of said chamber and feed screw shaft.

24. A hand-held device for the application of plaster, cement, mortar or grouting material onto a surface, said device comprising:

a hand grip portion;

a chamber for holding said material therein, said chamber having a top and a discharge end;

a nozzle in fluid communication with said chamber discharge end, said nozzle having a material receiving end and defining an outlet aperture at an end thereof distal from said chamber and receiving end, said nozzle outlet aperture having an axis;

a feed screw having a shaft with a longitudinal axis, said feed screw being at least in part disposed within said chamber to feed said material from said chamber into said nozzle receiving end whereby said material will be forced out through said nozzle aperture;

a drive motor for said feed screw, said drive motor being off-axis from the axis of said feed screw shaft;

gear means for connecting said drive motor to said feed screw shaft at the end of said shaft distal from said nozzle; and a battery supply for said drive motor;

wherein said nozzle outlet aperture axis is oriented at an acute angle with respect to said feed screw shaft axis;

wherein said hand-grip portion, chamber and nozzle aperture axis are oriented with respect to one another such that when the device is held in the hand with the nozzle aperture axis generally transversely oriented with respect to a surface which is to receive said material, said chamber and feed screw shaft are inclined to the horizontal to allow said material to be fed to said nozzle receiving end by gravity; and wherein said hand-grip portion, drive motor and battery supply are mounted on said device such that when the device is held in the hand, in use, they are below the top of said inclined chamber.

* * * * *